(12) United States Patent
Gallardo Rosado (10) Patent No.: US 12,017,752 B2
(45) Date of Patent: Jun. 25, 2024

(54) INDUCED AUTOROTATION ROTATING WING

(71) Applicant: Maydeli Gallardo Rosado, Mexico City (MX)

(72) Inventor: Rodrigo Gallardo Rosado, Mexico City (MX)

( * ) Notice: Subject to any disclaimer, the term of this patent is extended or adjusted under 35 U.S.C. 154(b) by 9 days.

(21) Appl. No.: 17/913,041

(22) PCT Filed: Mar. 20, 2020

(86) PCT No.: PCT/MX2020/000012
§ 371 (c)(1),
(2) Date: Sep. 20, 2022

(87) PCT Pub. No.: WO2020/222634
PCT Pub. Date: Nov. 5, 2020

(65) Prior Publication Data
US 2023/0312081 A1    Oct. 5, 2023

(30) Foreign Application Priority Data

Mar. 29, 2019  (MX) ................................ 2019003715

(51) Int. Cl.
*B64C 11/24* (2006.01)
*B64C 11/18* (2006.01)

(52) U.S. Cl.
CPC .............. *B64C 11/18* (2013.01); *B64C 11/24* (2013.01)

(58) Field of Classification Search
CPC ................................. B64C 11/18; B64C 11/24
See application file for complete search history.

(56) References Cited

U.S. PATENT DOCUMENTS

| | | | | |
|---|---|---|---|---|
| 1,344,496 A | * | 6/1920 | Flattum | B64C 11/16 416/200 R |
| 1,779,026 A | * | 10/1930 | Wragg | F04D 29/327 416/200 R |
| 2,066,336 A | * | 1/1937 | Goodman | B64C 9/24 244/211 |
| 3,784,322 A | * | 1/1974 | Erich | B64C 11/22 415/217.1 |
| 3,949,957 A | * | 4/1976 | Portier | B64C 9/26 244/210 |
| 4,360,176 A | * | 11/1982 | Brown | B64C 9/24 244/214 |
| 4,687,416 A | * | 8/1987 | Spranger | B64C 11/16 416/200 R |
| 4,840,540 A | * | 6/1989 | Kallergis | B64C 11/16 416/200 R |

(Continued)

*Primary Examiner* — Eric J Zamora Alvarez
*Assistant Examiner* — Theodore C Ribadeneyra
(74) *Attorney, Agent, or Firm* — The Sladkus Law Group (57) ABSTRACT

This invention describes a rotating wing that provides lift to an aircraft and that is driven by autorotation. It is a naturally stable rotating wing as it does not generate torque and is very safe because it uses autorotation at all times to drive its blades. The design of the blades allows you to use the autorotation in two different ways. The first dependent on the airflow created by moving the aircraft from one place to another and which provides a cruise flight mode and the second independent of the aircraft's movement from one place to another to provide a static flight mode that includes the ability to take off and land vertically, as well as hover at a static point in the air.

11 Claims, 8 Drawing Sheets

(56) References Cited

U.S. PATENT DOCUMENTS

| | | | | |
|---|---|---|---|---|
| RE34,207 E | * | 3/1993 | Nelson | B64C 11/18 |
| | | | | 416/DIG. 2 |
| 6,769,872 B2 | * | 8/2004 | Torok | B64C 27/615 |
| | | | | 416/1 |
| 6,840,741 B1 | * | 1/2005 | Wake | B64C 27/467 |
| | | | | 416/243 |
| 6,932,569 B2 | * | 8/2005 | Torok | B64C 27/615 |
| | | | | 416/155 |
| 7,025,569 B2 | * | 4/2006 | Chang | F04D 29/384 |
| | | | | 416/214 R |
| 7,594,625 B2 | * | 9/2009 | Robertson | B64C 27/467 |
| | | | | 244/70 |
| 8,011,886 B2 | * | 9/2011 | Subramanian | F03D 1/06 |
| | | | | 416/23 |
| 8,777,580 B2 | * | 7/2014 | Eisenberg | F03D 1/0641 |
| | | | | 416/239 |
| 9,211,950 B2 | * | 12/2015 | Hein | B64C 27/615 |
| 9,505,492 B2 | * | 11/2016 | Scott | B64C 27/615 |
| 10,036,392 B2 | * | 7/2018 | Gallina | F04D 19/002 |
| 2010/0143152 A1 | * | 6/2010 | Subramanian | F03D 1/06 |
| | | | | 29/889.71 |
| 2015/0225080 A1 | * | 8/2015 | Bormann | F03D 9/25 |
| | | | | 244/155 A |
| 2016/0244147 A1 | * | 8/2016 | Arata | B64C 11/04 |
| 2017/0114789 A1 | * | 4/2017 | Niemiec | F04D 25/088 |
| 2017/0274978 A1 | * | 9/2017 | Beckman | B64C 39/024 |
| 2021/0101677 A1 | * | 4/2021 | Thalheimer | B64C 27/54 |
| 2022/0111955 A1 | * | 4/2022 | Kelaidis | B64C 27/467 |

* cited by examiner

INDUCED AUTOROTATION ROTATING WING

CROSS-REFERENCE TO RELATED APPLICATIONS

This application claims priority to and the benefit of PCT Patent Application No. PCT/MX2020/000012 filed on Mar. 20, 2020, which claims priority to Mexico Patent Application No. MX/a/2019/00375 filed on Mar. 29, 2019, each of which are incorporated herein in their entirety by reference.

TECHNICAL FIELD

This invention relates to the aeronautical industry as it is a rotating wing that provides lift to an aircraft. More specifically to one that uses autorotation to drive the movement of the blades and provide the ability to take off and land vertically, as well as hover at a static point in the air.

BACKGROUND

Rotating wings have been used to provide lift to various types of aircraft. Depending on the system used, the rotating wings can provide lift, but also thrust. One of the great qualities of some systems is that they can provide an aircraft with the ability to take off and land vertically as well as hover at a static point in the air.

The main system that has been used is one in which the rotor is driven by a motor from the rotating shaft. This system is used in aircrafts known as helicopters. It is a very complex system to understand in terms of physics and aerodynamics but the basis of its operation can be summarized as follows:

- The rotor is driven by a motor from the rotating shaft.
- The rotor generates lift as well as thrust.
- The spinning of the rotor generates torque which makes the system naturally unstable as the aircraft will attempt to turn about the rotation shaft, but in the opposite direction to that in which the rotor is spinning. Because of this, it is necessary to have a system to counteract the torque, for example, a tail rotor or to set up the aircraft with two main rotors that rotate in opposite directions.
- The rotor has mechanisms that control the angle of incidence of the blades cyclically and collectively to increase or decrease lift and control rotor thrust.
- In this system, the rotation of the blades causes the air to flow from the top to the bottom of the rotor.

The system has great advantages such as providing an aircraft with the ability to take off and land vertically, as well as hover at a static point in the air and move in any direction.

The system also has major disadvantages such as the fact that it is a naturally unstable system due to the torque generated by the spinning of the rotor. It is also complex because of the mechanisms used to control lift, thrust and to counteract rotor torque. The system is costly to manufacture, maintain, operate and difficult to pilot.

There is a variant of the above system that is important to mention. It is a system in which multiple rotors are used. They are all driven by motors so they generate torque, but it is possible to counteract this by making the rotors rotate in opposite directions. In this system it is not necessary to have mechanisms that control the angle of incidence of the blades, the rotors together generate and control both lift and thrust by varying the speed of rotation of the rotors in a very precise manner.

The system has great advantages such as providing an aircraft with the ability to take off and land vertically, as well as hover at an aesthetic point in the air and move in any direction.

The main disadvantage of this system is that in order to control the rotational speed of the rotors very precisely, the motors that drive them must be electric, and this means that their flight time and charging capacity are limited to the capacity of the batteries.

There is another rotating wing system that operates differently from the previous two. This is used in a type of aircraft that has different names such as gyroplane, autogyro or gyrocopter and the basis of its operation can be summarized as follows:

- The fundamental difference of this system is that the rotor is not driven by a motor. The rotor rotates freely about the rotation shaft driven by a phenomenon called autorotation, in which a flow of air passing through the blades causes them to rotate and generate lift.
- The rotor generates lift, but not thrust.
- The rotation of the rotor does not generate torque which makes the system naturally stable and there is no need for a torque counteracting system.
- The rotor has mechanisms that control the angle of incidence of the blades.
- In this system the air flows from the bottom to the top of the rotor.
- In this system, the airflow that makes autorotation possible is generated when the aircraft moves from one place to another, so the aircraft has an engine, but it is not connected to the main rotor, it serves the purpose of generating horizontal thrust to propel the aircraft forward. This can be done by means of a propeller or other horizontal propulsion system in a configuration similar to that used in fixed-wing aircraft.

The airflow that makes autorotation possible comes from the front of the aircraft and flows from the bottom to the top of the rotor, unlike the system used in helicopters where the rotation of the propellers causes the air to flow from the top to the bottom of the rotor. An interesting feature is that in gyroplane rotors the blades accelerate their forward motion when they receive an airflow at their front which means that the blades have the ability to accelerate their motion in the opposite direction to the direction of the air flow impacting them at their front.

In the rotor system of gyroplanes, the lift increases with increasing rotor speed and this is controlled by increasing the horizontal thrust which increases the air flow through the rotor blades. It is for this reason that the system lacks the complexity of the system used in helicopters since there is no need for a mechanism to control the angle of incidence of the blades to increase or decrease lift. Airflow is obtained and increased by increasing horizontal thrust but also, once the aircraft is in the air, it is obtained by losing altitude when horizontal thrust decreases or stops. This makes this type of aircraft very safe because once they are in the air they can descend gradually to the ground without the aid of any kind of engine, only using the airflow generated with altitude loss, which flows through the rotor from bottom to top and keeps the rotor spinning.

In this type of system, the rotor works even in aircrafts that do not have a thrust motor and can only be towed by another vehicle, whether on land or water, to obtain the air flow that makes autorotation possible.

Another important feature to mention is that autorotation can be used by helicopters when making an emergency descent in case of engine or drive failure. When losing altitude, the airflow is reversed, if during normal flight it flows from top to bottom in autorotation it flows from bottom to top, accelerating the rotor spin and allowing a controlled descent to the ground.

The rotating wing system used by the gyroplanes has great advantages such as the fact that it is a naturally stable system since the rotation of the rotor does not generate torque and therefore the aircraft does not need to have a mechanism to counteract it. It is also a simpler system since it does not require mechanisms that change the angle of incidence of the blades to control the elevation. It is a very safe system since the movement of the rotor is automatic and independent from the operation of a motor. It is a system that is less difficult to pilot compared to the system used by helicopters, and it is also less expensive to manufacture, maintain and operate.

This system also has disadvantages as it cannot provide an aircraft with vertical takeoff and landing. It also does not have the ability to hover at a static point in the air unless the aircraft receives an airstream at its front derived from atmospheric conditions.

It is important to mention that rotating wing systems that combine features of both helicopter and gyroplane systems have been made. This has been done to take advantage of both, for example, by configuring aircrafts with a system that uses autorotation for cruise flight but which temporarily connects the rotor to a motor and incorporates a mechanism that varies the angle of incidence of the blades to achieve a vertical takeoff. There have been several methods that combine the two types of systems, but it is important to mention that such combinations have been made in which the incorporation of mechanisms of the helicopter system has also incorporated their complications and disadvantages. Aircrafts that use the traditional helicopter system but incorporate additional horizontal thrust rotors to increase cruise speed have also been configured.

It is also important to mention that there is a rotating wing system that presents an important difference in terms of design and operation. It is a system in which the tip of the blades has a propulsion device such as a rocket engine. The propulsion device is powered by fuel that is transported through the inside of the blade from the rotating shaft to the tip. An important characteristic of this type of system is that, since it is driven from the tip of the blades, the rotation of the rotor does not generate torque, so it is not necessary to have a system to counteract it.

SUMMARY

This application proposes a rotating wing that provides lift to an aircraft and is driven by autorotation, characterized by having blades whose particularity is that each one is formed by an aerodynamic structure in the shape of an individual blade that has an aerodynamic structure at the front through which it is provided with a flow of air that impacts its front part and accelerates its forward movement using the phenomenon of autorotation. In this way the rotating wing is able to provide an aircraft with vertical take-off and landing capability, as well as hovering at a static point in the air since it does not need to move to obtain the airflow to rotate the blades. The lift increases or decreases as the revolutions per minute of blade rotation increase or decrease and this is regulated by controlling the speed of the air flow out of the front aerodynamic structure.

The rotating wing that provides lift to an aircraft and that is driven by autorotation is characterized in that the front aerodynamic structure providing the air flow is in the form of a front section of a single gyroplane blade and its rear part fits into the front part of the rear aerodynamic structure which is itself in the form of a single gyroplane blade.

The front structure has or along a hollow part through which a flow of air is injected that goes in the direction of the rotation shaft towards the blade tip and which is subsequently expelled through openings in the rear of the front aerodynamic structure so that this airflow impacts the front of the rear aerodynamic structure which itself having the aerodynamic shape of an individual gyroplane blade has the ability to autorotate and accelerate its forward motion by receiving the airflow at its front.

The structures that make up the blade can be joined as a single piece or separated by rods that are attached to the front aerodynamic structure and shift in and out of the rear aerodynamic structure. So, there are two types of positions to modalities to generate the autorotation.

In the first position the front and rear aerodynamic structures are united as a single structure whose aerodynamic shape and function are the same as those of a single gyroplane blade. In this mode, no air flow is injected through the hollow part of the front structure. The airflow generated by autorotation is obtained by moving the aircraft either by increasing the horizontal thrust of the aircraft forward or once in the air when descending due to lack of horizontal thrust. This is the standard autorotation position since the airflow that generates the autorotation is obtained by moving the aircraft from one place to another so it is used for a cruise flight mode. In this position the elevation increases or decreases as the rotor speed increases or decreases and this is controlled by increasing or decreasing the horizontal thrust of the aircraft.

In the second position the front and rear aerodynamic structures are separated, they are only connected by the rods that are fixed to the front aerodynamic structure and shift in and out of the rear aerodynamic structure. Both structures continue to maintain the aerodynamic form of a single gyroplane blade, but with a space between the two through which the front structure provides the rear with the air flow that is previously injected through the hollow part of the front aerodynamic structure. This is the induced autorotation position since the airflow that generates the autorotation is independent of the aircraft's displacement, which is used for a stationary flight mode, i.e., to be able to take off and land vertically, as well as to hover at a static point in the air. In this position the elevation increases or decreases as the rotor speed increases or decreases, which is controlled by the speed of the air flow that is injected into the blade system.

DETAILED DESCRIPTION

This invention is a rotating wing that provides lift to an aircraft and uses autorotation as the basis of its operation. As in a gyroplane, the movement of the rotor is generated by a flow of air passing through the blades, but a major difference is that the air flow is obtained independently from the displacement of the aircraft or the atmospheric conditions. In this way the rotor can provide an aircraft with the ability to take off and land vertically, as well as hover at a static point in the air. This is in addition to the capability to autorotate in a standard way when the aircraft shifts from one place to another.

Unlike systems where helicopter rotor mechanisms and gyroplanes have been combined, no helicopter system mechanisms are used in this system. The rotor is never connected to or driven by a motor so that the rotation of the rotor does not generate torque. Also, the system does not use mechanisms to vary the angle of incidence of the blades, the elevation increases or decreases as the rotor speed decreases. This invention has the advantages of a gyroplane rotor starting with the fact that it is a naturally stable system since the spinning of the rotor does not generate torque. It is also a very safe and reliable system as it operates by autorotation at all times and does not rely on a mechanical connection to a motor. It is a system that lacks the need for complicated mechanisms to control the angle of incidence of the blades and to compensate the motor torque. In addition to having the advantages of the gyroplane system it can provide an aircraft with the ability to take off and land vertically, as well as hover at a static point in the air.

In addition to mentioning that the system does not incorporate mechanisms of the system used by helicopters, it is important to mention that it does not use a propulsion system at the tip of the blades to turn the rotor. To better understand this invention, we can consider that the systems that have been used to drive a rotor and provide it with the ability to take off and land vertically, as well as hover at a static point in the air, have driven the rotor from either end of the blades. Either from the rotating shaft using a motor or from the blade tips using a propulsion system. An important difference of this invention is that the rotor would use the surface in the middle of the blade to have those capabilities. This is possible since this rotating wing would have the ability to autorotate at all times.

In the same way it could autorotate in a gyroplane thanks to the airflow derived from moving the aircraft forward when losing altitude, but it could also induce its own autorotation during takeoff, landing and to hover at a static point in the air. Autorotation could be induced by the design of the blades.

Figure 1:
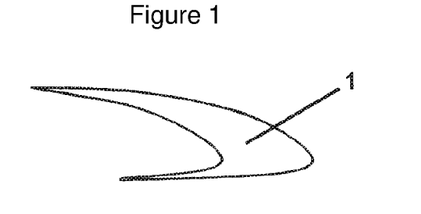
FIG. 1 is the profile view of the aerodynamic shape of a front aerodynamic structure of a blade of a rotating wing.
Figure 2:
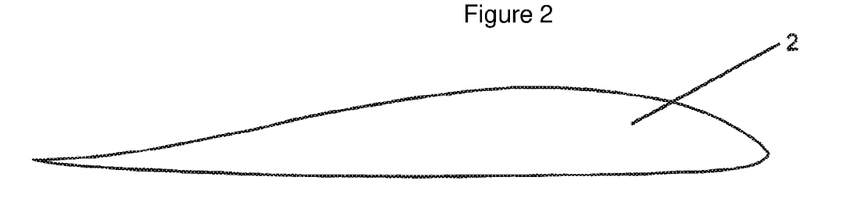
FIG. 2 is the profile view of the aerodynamic shape of a rear aerodynamic structure of a blade of a rotating wing.
Figure 3:
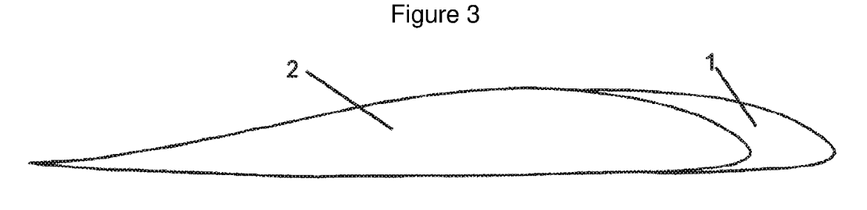
FIG. 3 is the profile view of the aerodynamic shape of a blade of a rotating wing in which the front aerodynamic structure and the rear aerodynamic structure are joined in a standard autorotation position.
Figure 4:
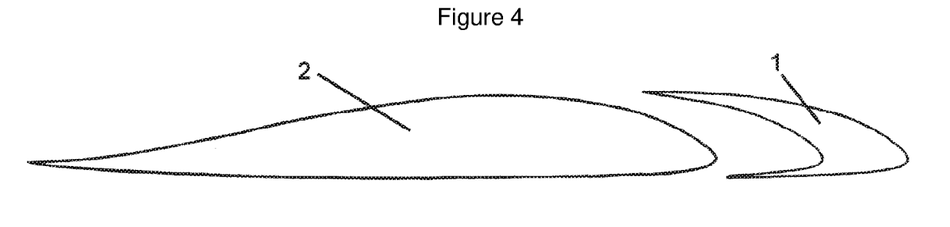
FIG. 4 is the profile view of the aerodynamic shape of a blade of a rotating wing in which the front aerodynamic structure and the rear aerodynamic structure are separated in a position of induced autorotation.

Standard helicopter and gyroplane blades consist of a single piece, but on this rotor the blades are compound which means that each blade is made up of two parts. They are two aerodynamic structures that fit together, a front aerodynamic structure (1) and a rear aerodynamic structure (2) joined in a configuration that allows the two structures to be completely joined or partially separated resulting in two types of positions. The first, completely joined position is the standard autorotation position and the second, partially separated position is the induced autorotation position.

Figure 5:
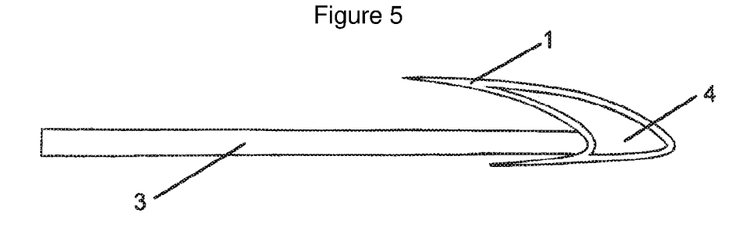
FIG. 5 is the profile view of the front aerodynamic structure of the blade, showing a hollow portion that runs through the front aerodynamic structure and a plurality of rods fixed to the front aerodynamic structure.
Figure 8:
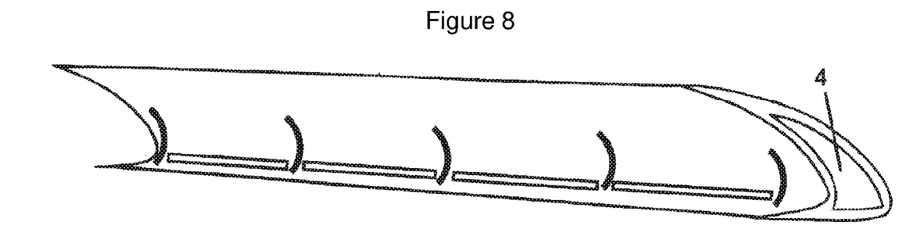
FIG. 8 is a rear view of a section of the front aerodynamic structure showing the locations to which the rods are attached.
Figure 9:
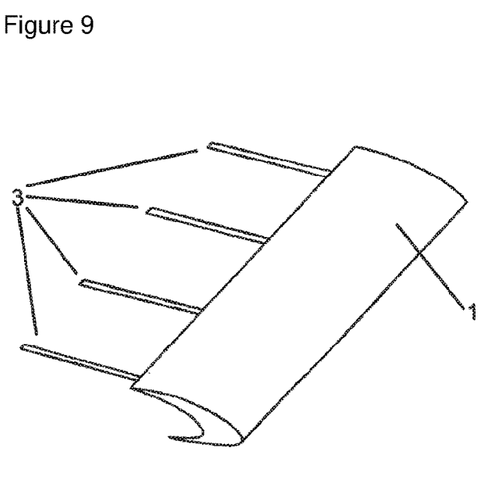
FIG. 9 is a perspective view of a section of the front aerodynamic structure with the rods attached.
Figure 11:
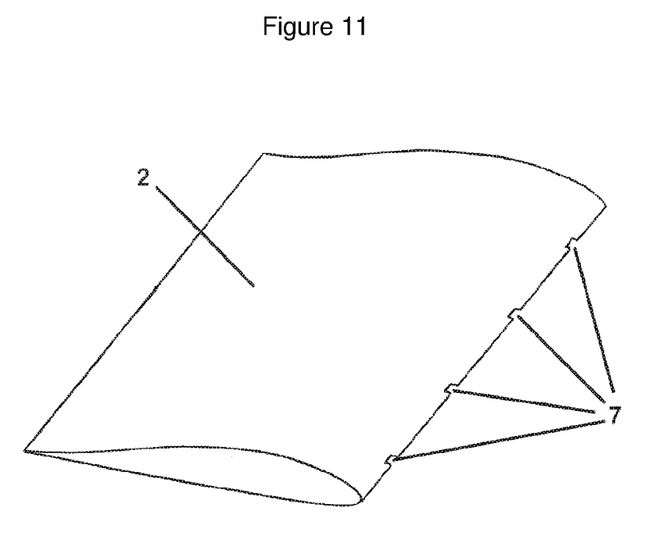
FIG. 11 is a perspective view of a section of the rear aerodynamic structure and the holes through which the fixed rods are inserted from the front aerodynamic structure.
Figure 12:
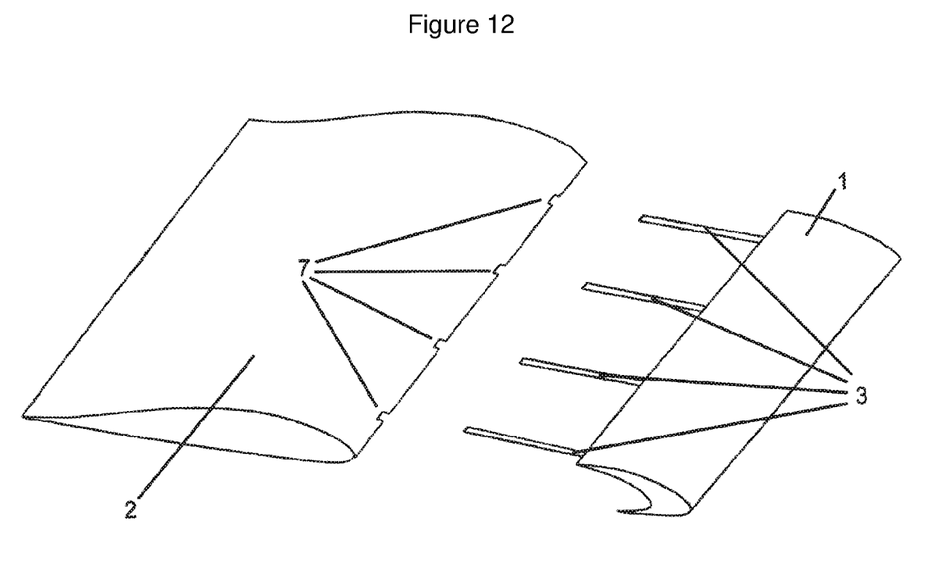
FIG. 12 is a perspective view of a section of the front aerodynamic structure and the rear aerodynamic structure showing the position of the rods of the front aerodynamic structure in relation to the holes of the rear aerodynamic structure.

The way in which the front and rear aerodynamic structures are joined and partially separated is by means of rods (3) that are fixed to the front aerodynamic structure (1). These rods (3) enter the rear aerodynamic structure (2) through holes defined in a front part (7) of the rear aerodynamic structure (2) so that when the two aerodynamic structures are together the rods (3) remain inside the rear aerodynamic structure (2) which has enough length to store them. When the two aerodynamic structures are partially separated, the rods (3) shift to the front of the rear aerodynamic structure (2) so that they project the front aerodynamic structure (1) forward. The movement of the rods forward or backward of the rear aerodynamic structure (2) is generated from within it and can be driven hydraulically or electrically.

Figure 13:
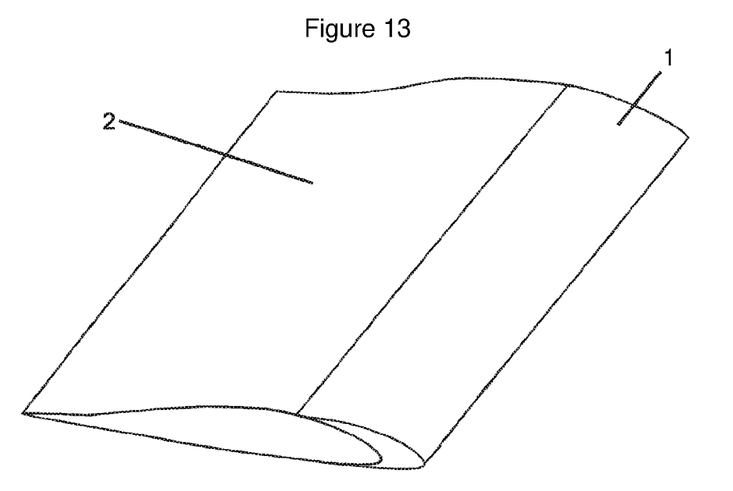
FIG. 13 is a perspective view of a section of the blade where the front aerodynamic structure and the rear aerodynamic structure that make up the blade are joined together in a standard autorotation position.
Figure 14:
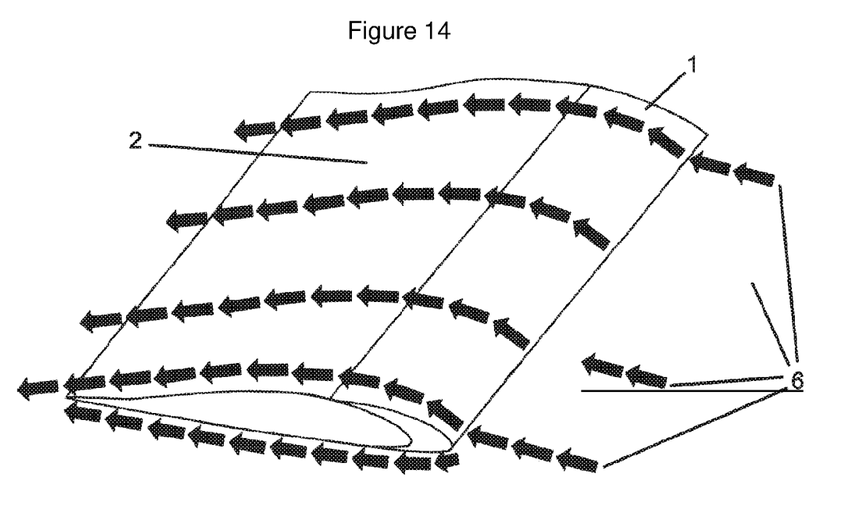
FIG. 14 is a perspective view of a section of the blade in the standard autorotation position and where the direction of the airflow derived from the aircraft's displacement is shown.
Figure 17:
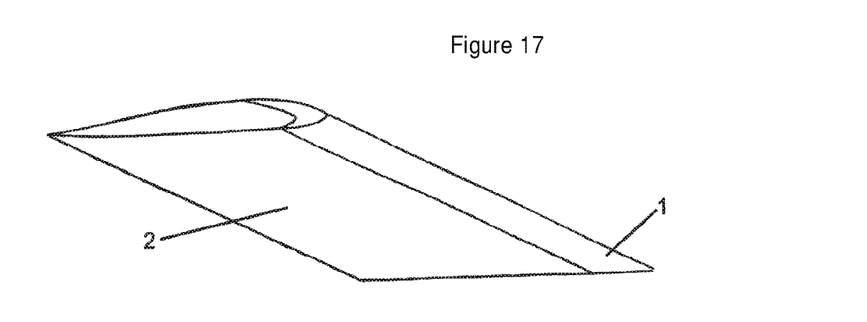
FIG. 17 is a perspective view of a section of the blade where the front aerodynamic structure and the rear aerodynamic structure that make up the blade are joined together in a standard autorotation position.
Figure 18:
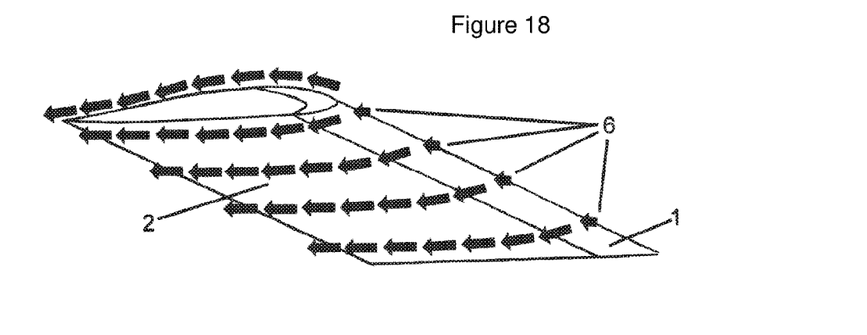
FIG. 18 is a perspective view of a section of the blade in the standard autorotation position and where the direction of airflow derived from the aircraft's displacement is shown.

In the standard autorotation position the two aerodynamic structures are joined together and have the aerodynamic shape of a single (one-piece) gyroplane blade. In this way the autorotation is generated by receiving an air flow (6) derived from the displacement of the aircraft. This would be the position of the blade for a cruise flight mode.

Figure 15:
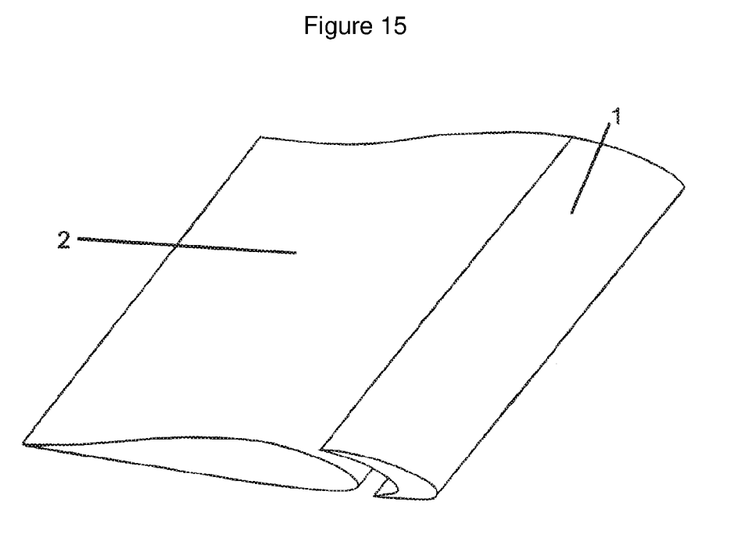
FIG. 15 is a perspective view of a section of the blade where the front aerodynamic structure and the rear aerodynamic structure that make up the blade are separated in an induced autorotation position.
Figure 16:
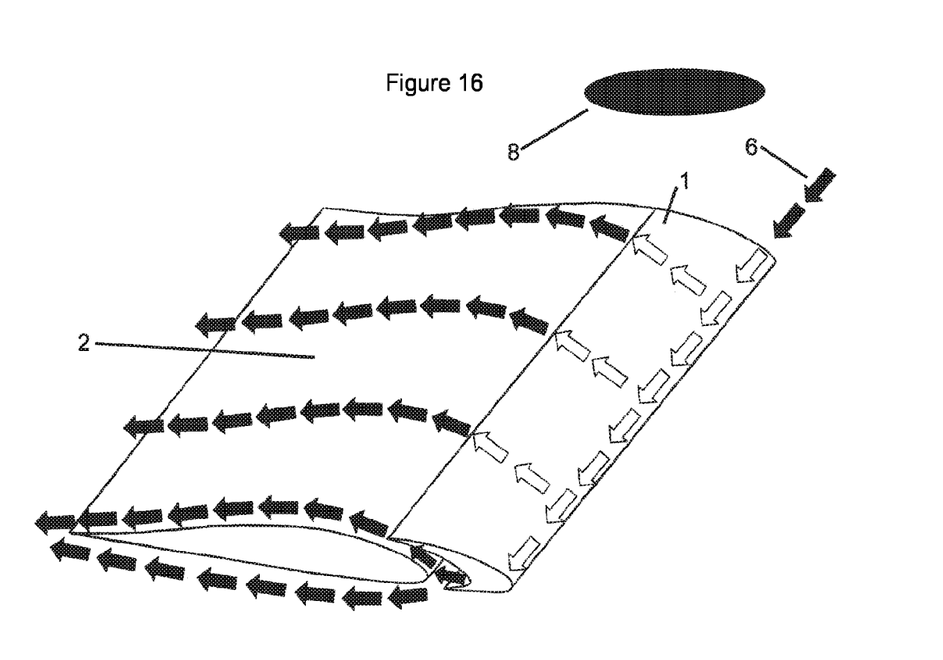
FIG. 16 is a perspective view of a section of the blade in the induced autorotation position and where the direction of the air flow injected from the rotation shaft is shown. The white arrows show the direction the air flow takes as it passes through the hollow part inside the front aerodynamic structure and the black arrows show the direction the air flow takes after it is expelled through the openings.
Figure 19:
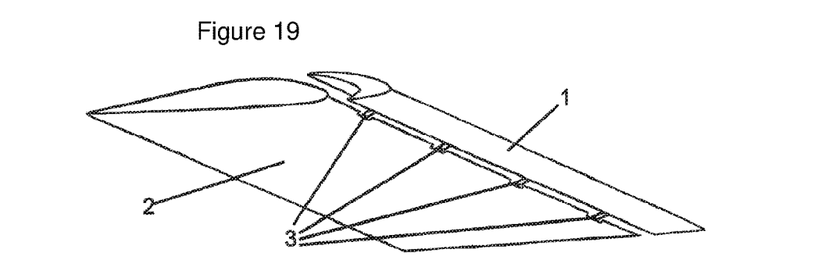
FIG. 19 is a perspective view of a section of the blade where the front aerodynamic structure and the rear aerodynamic structure that make up the blade are separated in the induced autorotation position.
Figure 20:
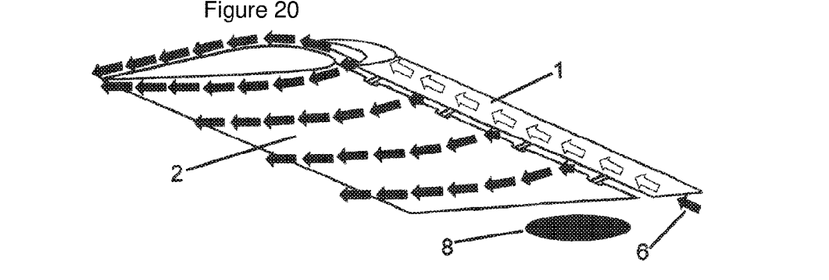
FIG. 20 is a perspective view of a section of the blade where the front aerodynamic structure and the rear aerodynamic structure that make up the blade are separated in the induced autorotation position and where the direction of the injected air flow from the rotation shaft is shown. The white arrows show the direction the air flow takes as it passes through the hollow part inside the front aerodynamic structure and the black arrows show the direction the air flow takes after it is expelled through the openings.
Figure 21:
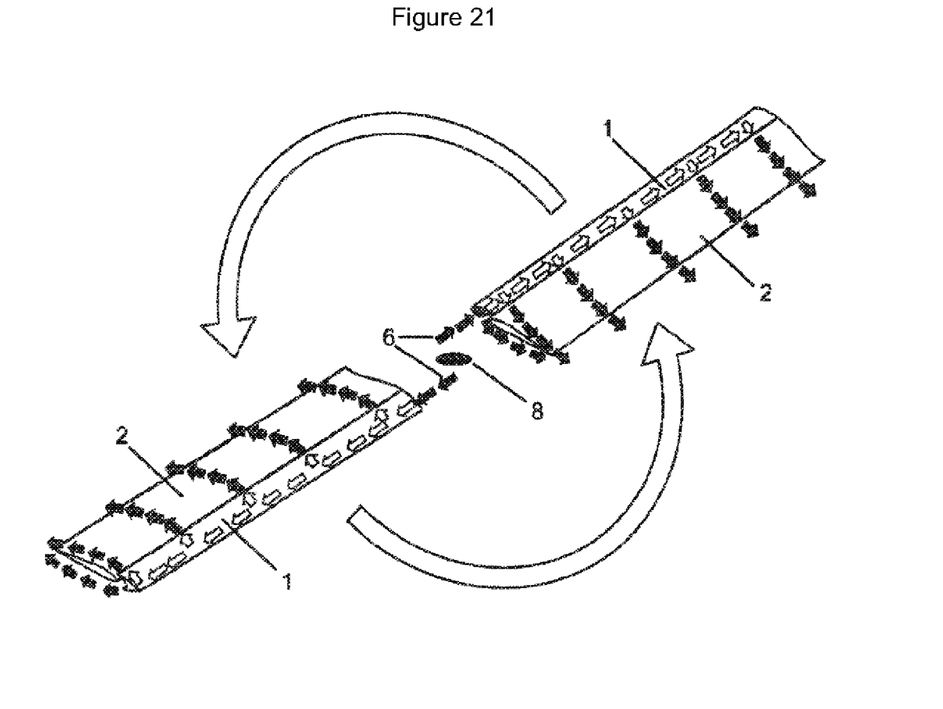
FIG. 21 is the perspective view of two blade sections in induced autorotation position where the movement of the air flow with respect to the direction of blade movement is shown.

For vertical takeoff and landing or hovering at a static point in the air, the induced autorotation position is used. In this position the two aerodynamic structures are partially separated. The two aerodynamic structures still maintain an aerodynamic shape similar to that of a single gyroplane blade, but with a space between them through which the front aerodynamic structure (1) provides the rear aerodynamic structure (2) with an airflow that activates autorotation. This is possible because the rear aerodynamic structure (2) itself has the aerodynamic shape of an individual gyroplane blade which, upon receiving an air flow in its front part (7), accelerates its movement forward.

Figure 6:
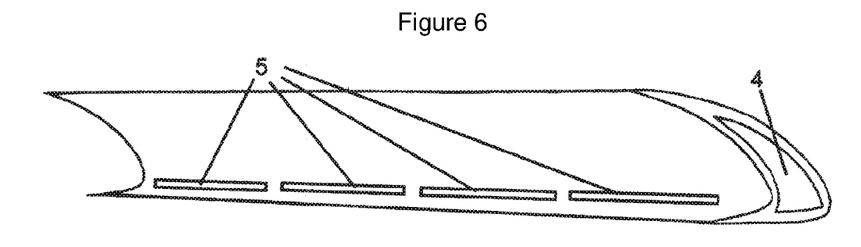
FIG. 6 is the rear view of a section of the front aerodynamic structure showing the position of openings defined in the front aerodynamic structure through which the air flow that was injected from the rotation shaft exits the hollow portion.
Figure 7:
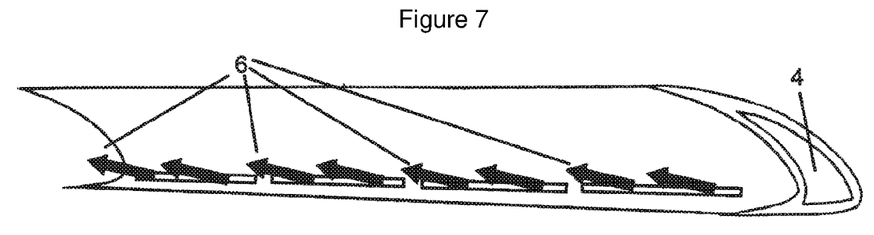
FIG. 7 is the rear view of a section of the front aerodynamic structure showing the direction of the air flow that is expelled through the openings and that was previously injected from the shaft of rotation.
Figure 10:
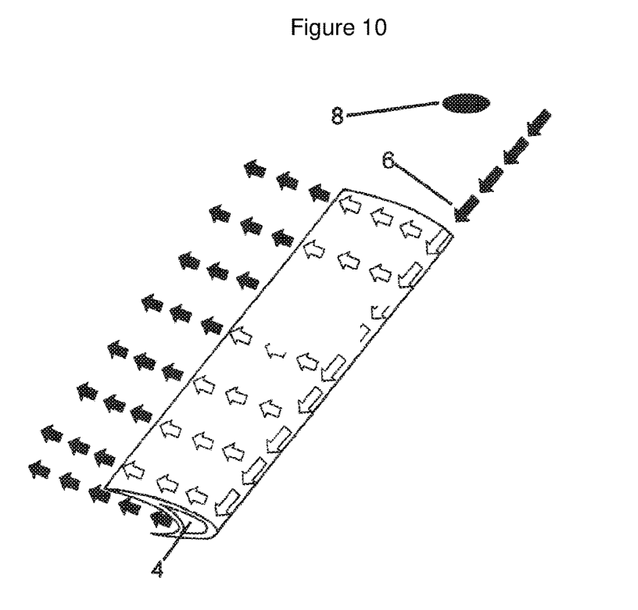
FIG. 10 is a perspective view of a section of the front aerodynamic structure with the direction of air flow injected from the rotation shaft. The white arrows show the direction the air flow takes when passing through the hollow part and the black arrows show the direction the air flow takes after it is expelled through the openings.

The front aerodynamic structure (1) has a hollow part (4) along its length through which an air flow (6) is injected. This air flow (6) is subsequently expelled through a plurality of openings (5) defined in the front aerodynamic structure (1) that face backwards towards the front (7) of the rear aerodynamic structure (2).

The air flow (6) is injected from a rotation shaft (8) and can be generated in different ways, for example by an air compressor in the aircraft by the horizontal thrust motor, but redirecting the air flow (6) using conduits towards the rotation shaft (8) and subsequently towards the hollow part (4) of the front aerodynamic structure (1) of the blade. As in a gyroplane rotor, the lift is controlled by the speed of the rotor rotation and this in turn is controlled by varying the speed of the air flow (6) that is injected into the system.

Because this rotating wing is naturally stable, very safe, with good payload capacity, with lower operating and maintenance costs (compared to helicopter systems) and with less difficulty in piloting an aircraft using it, its industrial application is broad and versatile.

The system also offers the advantage of the flexibility to be used on aircrafts powered by electric, internal combustion or hybrid engines so this type of rotating wing could be used in manned and unmanned aircrafts for both civilian and military use.

For example, it could be used in personal transport aircrafts (for one or two people) with the ability to outperform existing designs in terms of safety, stability, load capacity, cost of operation and ease of piloting. It could also be used in unmanned aircrafts for military reconnaissance use and be able to have stealth Characteristics (if used with an electric propulsion system) such as a low thermal footprint for infrared sensors, as well as low noise levels. It could also be incorporated into various types of aircrafts depending on the specific needs of each designer or builder.

The invention claimed is:

1. A rotating wing that provides lift to an aircraft and is driven by autorotation comprising:
    a rotation shaft and plurality of compound blades coupled to the rotation shaft, w herein each compound blade comprises a front aerodynamic structure and a rear aerodynamic structure,
    wherein the front aerodynamic structure and the rear aerodynamic structure are coupled together such that the position of the front aerodynamic structure is selectively adjustable relative to the rear aerodynamic structure, such that in a standard autorotation position, the front aerodynamic structure is completely joined to the rear aerodynamic structure, and in an induced autorotation position, the front aerodynamic structure is spaced from the rear aerodynamic structure a predetermined distance,
    wherein in the standard autorotation position, a rear part of the front aerodynamic structure fits into a front part of the rear aerodynamic structure, and wherein in the standard autorotation position, the front aerodynamic structure and the rear aerodynamic structure fit together to form a single continuous blade, and wherein a hollow part is defined in the front aerodynamic structure and wherein a plurality of openings are defined in the rear part of the front aerodynamic structure such that air can be injected though the hollow part and out of the openings.

2. The rotating wing of claim 1, wherein air is injectable from a direction of the rotation shaft through the hollow part and towards a tip of each blade, wherein the injected air is expelled through the openings such that the expelled air impacts the front of the rear aerodynamic structure, and wherein the rear aerodynamic structure autorotates to the induced autorotation position upon receiving the airflow at the front of the rear aerodynamic structure.

3. The rotating wing of claim 2, further comprising a plurality of rods attached to the front aerodynamic structure, wherein the plurality of rods couple the front aerodynamic structure to the rear aerodynamic structure by extending through holes defined in the rear aerodynamic structure.

4. The rotating wing of claim 3, wherein in the standard autorotation position, no air is injected through the hollow part of the front aerodynamic structure and the airflow generated by autorotation is obtained by increasing a horizontal thrust of the aircraft forward or by increasing speed of the aircraft due to descending.

5. The rotating wing of claim 4, wherein in the standard autorotation position, elevational increases of the aircraft are created by increasing a rotational speed of the rotor shaft, wherein the rotational speed of the rotor shaft is increased by increasing the horizontal thrust of the aircraft, and elevational decreases of the aircraft are created by decreasing the rotational speed of the rotor shaft, and wherein the rotational speed of the rotor shaft is decreased by decreasing the horizontal thrust of the aircraft.

6. The rotating wing of claim 5, wherein in the induced autorotation position, the front aerodynamic structure provides the rear aerodynamic structure with the air flow that was injected through the hollow part and out of the openings of the front aerodynamic structure, wherein in the induced autorotation position, the autorotation is independent of a horizontal movement of the aircraft, and wherein in the induced autorotation position, the aircraft can takeoff and land vertically.

7. The rotating wing of claim 6, wherein in the induced autorotation position, elevational increases of the aircraft are created by increasing the rotational speed of the rotor shaft, wherein the rotational speed of the rotor shaft is increased by increasing a flow rate of air injected into the hollow part of the front aerodynamic structure, and elevational decreases of the aircraft are created by decreasing the rotational speed of the rotor shaft, and wherein the rotational speed of the rotor shaft is decreased by decreasing the flow rate of air injected into the hollow part of the front aerodynamic structure.

8. The rotating wing of claim 7, wherein movement of the rods relative to the rear aerodynamic structure is driven hydraulically.

9. The rotating wing of claim 7, wherein movement of the rods relative to the rear aerodynamic structure is driven electrically.

10. The rotating wing of claim 8, wherein the air flow injected into the hollow part of the front aerodynamic structure is generated by an air compressor in the aircraft.

11. The rotating wing of claim 8, wherein the air flow injected into the hollow part of the front aerodynamic structure is generated by redirecting air flow using conduits directing air from outside the aircraft towards the rotation shaft.

* * * * *